(12) United States Patent
Meyer et al.

(10) Patent No.: US 6,185,223 B1
(45) Date of Patent: Feb. 6, 2001

(54) APPARATUS AND METHOD FOR PROVIDING FIRE WALL PROTECTION FOR SYSTEMS IN COMMUNICATION WITH AN A SYNCHRONOUS TRANSFER MODE SYSTEM

(75) Inventors: David R. Meyer, Lakewood; Warner B. Andrews, Jr., Boulder, both of CO (US)

(73) Assignee: Conexant Systems, Inc., Newport Beach, CA (US)

( * ) Notice: Under 35 U.S.C. 154(b), the term of this patent shall be extended for 0 days.

(21) Appl. No.: 08/767,109

(22) Filed: Dec. 4, 1996

(51) Int. Cl.[7] .......................... H04L 12/54; H04L 12/28; H04L 12/56; H04L 12/66
(52) U.S. Cl. .......................... 370/429; 370/412; 370/463
(58) Field of Search .................................. 370/234, 412, 370/468, 232, 236, 398, 395, 397, 235, 905, 400, 401, 229, 230, 443, 414; 709/233, 251, 246, 235; 710/53, 57

(56) References Cited

U.S. PATENT DOCUMENTS

| | | | | |
|---|---|---|---|---|
| 3,979,733 | * | 9/1976 | Fraser | 370/395 |
| 4,093,823 | * | 6/1978 | Chu | 370/535 |
| 4,849,968 | * | 7/1989 | Turner | 370/236 |
| 5,282,203 | * | 1/1994 | Oouchi | 370/232 |
| 5,335,224 | * | 8/1994 | Cole et al. | 370/412 |
| 5,617,409 | * | 4/1997 | Ozerven et al. | 370/235 |
| 5,633,867 | * | 5/1997 | Ben-Nun et al. | 370/399 |
| 5,666,487 | * | 9/1997 | Goodman et al. | 709/246 |
| 5,781,533 | * | 7/1998 | Manning et al. | 370/236 |
| 5,812,786 | * | 9/1998 | Seaholtz et al. | 709/233 |
| 5,818,842 | * | 10/1998 | Burwell et al. | 370/397 |
| 5,867,480 | * | 2/1999 | Thomas et al. | 370/230 |
| 5,889,762 | * | 3/1999 | Pajuvirta et al. | 370/230 |
| 5,896,511 | * | 4/1999 | Manning et al. | 370/231 |
| 5,898,669 | * | 4/1999 | Shimony et al. | 370/232 |
| 5,970,048 | * | 10/1999 | Pajuvirta et al. | 370/230 |

FOREIGN PATENT DOCUMENTS

| | | |
|---|---|---|
| 3-205937 | 9/1991 | (JP) . |
| 7-48729 | 5/1995 | (JP) . |
| 07307737A | 11/1995 | (JP) . |
| 08065311A | 3/1996 | (JP) . |
| 08097829A | 4/1996 | (JP) . |
| 08186584A | 7/1996 | (JP) . |
| 09093262A | 4/1997 | (JP) . |

* cited by examiner

*Primary Examiner*—Huy D. Vu
*Assistant Examiner*—Kevin C. Harper
(74) *Attorney, Agent, or Firm*—Foley & Lardner

(57) ABSTRACT

An edge device for an ATM system includes a fire wall protection which proactively limits the number of cells per connection provided to the devices connected to the edge device. The edge device may be connected to ethernets, LANs, frame relay networks, communication equipment, work stations, or various other computer and communication equipment. The edge device preferably includes a counter for each connection associated with the ATM system. The counter is decremented each time a memory location in the host memory is utilized and incremented whenever the memory location is relieved of storing the data cell. An SAR unit operates to proactively prevent congestion by limiting each connection to a particular number of storage elements.

18 Claims, 3 Drawing Sheets

APPARATUS AND METHOD FOR PROVIDING FIRE WALL PROTECTION FOR SYSTEMS IN COMMUNICATION WITH AN A SYNCHRONOUS TRANSFER MODE SYSTEM

FIELD OF THE INVENTION

The present invention relates generally to communication systems for, and methods of transferring information through, a communication medium. More particularly, the present invention relates to an edge device coupled between a connection-oriented transmission system and another system.

BACKGROUND OF THE INVENTION

Various systems have been adopted to carry digitally encoded signals for communication applications, such as, telephone, video, and data services. These systems are often connection-oriented packet mode transmission systems, such as, asynchronous transfer mode (ATM) systems, frame relay systems, X.25 systems, or other transmission systems. Connection-oriented systems (e.g., ATM systems) have been employed in private and public communication systems or networks to transfer packetized signals (e.g., data cells or protocol data units) across communication lines, such as, telephone lines, cables, optical fibers, air waves, satellite links, or other communication media.

As an example, the ATM system transfers the data cells or units across the ATM system via connections or channels. The data cells can represent voice, sound, video, graphics, data, or combinations thereof for use in computing or communication applications. The connections can be part of a single physical link carrying a number of logical connections or be a single isolated path. The connections can be virtual channel connections (VCC), permanent virtual connections (PVC), switched virtual connections (SVC), or other types of connections. Connections are generally defined by a source and a destination for the data cell.

Generally, the ATM system communicates with systems, networks, or other equipment coupled to it via an edge device. The edge device receives the data cells from the ATM system and provides data units representing the cells to the systems coupled thereto. Additionally, the edge device receives data units from the systems coupled thereto it and provides data cells representative of the data units to the ATM system. Thus, the edge device can provide translation and routing functions, such as, adaptation, segmentation, and reassembly operations to interface the systems coupled to it to the ATM system. The edge device often must adapt the data cells of the ATM system to the formats of the systems coupled thereto. The edge device can be an adapting network interface card, an adapting hub, an adapting switch, an adapting concentrator, an ATM desktop device, a router access multiplexer, or other interface device.

As the ATM system provides data cells to the edge device, the data cells can saturate the equipment, the systems, the sub-networks, or the networks which are coupled to the edge device. If the ATM system provides a large number of data cells to a particular system, the system may not be able to keep up with the arrival of the data cells and can become overloaded. As the data cells are not transferred to the system coupled to the edge device, the ATM system exercises an early packet discard (EPD) operation, and the entire level 3 protocol data unit is dumped to avoid transmitting partially completed information in the ATM system. The level 3 protocol data unit can include a number of data cells. However, as protocol data units are dumped, the data cells in those units must be resent and further contribute to the congestion in the system coupled to the edge device as well as in the ATM system.

To prevent the ATM system from congesting the edge device and the systems coupled to the edge device, prior art edge devices have prevented data cells from the ATM system (e.g., turned off all connections) from entering the systems coupled to the edge device. These prior art edge devices have simply not allowed any cells from all connections in the ATM to reach the systems coupled to the edge device once a congestion situation is detected. Although this technique relieves congestion in the systems coupled to the edge device, this technique unnecessarily prevents data cells from all connections from being received, especially when only one connection or a few connections create the congestion problem.

For example, if a single connection in the ATM system is providing a large number of data cells, and other connections in the ATM system are providing a minimal or more typical number of cells, the technique of the prior art edge devices would simply turn off all connections, thereby preventing any cells from reaching the systems coupled to the edge device. In such a situation, the connections which are not causing the congestion would still be denied access to the system coupled to the edge device, even though only one connection ("the bad citizen") has caused the congestion. This type of congestion problem from a single or a few connections can be augmented by the EPD operation, because the dumped data cells are resent if part of the protocol data unit is lost. This is a particular difficulty if the connection or the system coupled to the edge device is experiencing a malfunction which prevents the cell from reaching the destination, because the connection continues to send the cell over and over due to the EPD operation. In such a situation, one connection in the ATM system can prevent all connections from reaching the system coupled to the edge device.

Thus, there is a need to more effectively relieve congestion on networks or systems coupled to a connection-oriented system. Further still, there is a need for a buffer or fire wall between the ATM system and other systems coupled to it which intelligently relieves congestion. Further still, there is a need for a proactive mechanism which limits data cell traffic coming into a system coupled to an edge device based upon operational parameters of the edge device and the system.

SUMMARY OF THE INVENTION

The present invention relates to an edge device for use with an asynchronous transfer mode or connection-oriented network having a plurality of connections. The edge device includes an asynchronous transfer mode interface adapted to be coupled to the asynchronous transfer mode system, a buffer, and a control circuit. The buffer has a plurality of buffer locations. The control circuit is coupled to the asynchronous transfer mode interface and to the buffer. The control circuit transfers data associated with the connections to the buffer slots. The control circuit includes a storage element. The storage element stores the number of buffer locations being utilized by each connection of the connections. The control circuit transfers the data in response to the number of buffer locations being utilized by each connection of the connections.

The present invention further relates to a method of operating an edge device for use with an asynchronous transfer mode or connection-oriented system having a plurality of communication connections. The edge device includes a buffer having a plurality of buffer locations. The method includes receiving data from a particular connection of the communication connections, obtaining a value representative of the number of the buffer locations used by the particular connection, and placing the data in a buffer location of the buffer locations if the value representative of the number of buffer locations used by the particular location indicates that at least one buffer location of the buffer locations for the particular connection is available.

The present invention further relates to a method of operating an edge device for use with an asynchronous transfer mode system having a plurality of communication connections. The edge device includes a buffer having a plurality of buffer locations coupled between an asynchronous transfer mode interface and a system interface. The method includes receiving a cell associated with a particular connection of the communication connections, reading an indication of the number of buffer locations used by the particular connection from a storage location, placing the cell in a particular buffer location of the buffer locations if the number of buffer locations used by the particular connection is below a threshold, and adjusting the indication of the number of buffer locations used by the particular connection.

According to one exemplary aspect of the present invention, a buffer is provided between an ATM or connection-oriented system and other systems. The other systems are coupled to ATM systems through a host system or edge device. The systems coupled to the edge device can be an ethernet network, a local area network (LAN), a frame relay network, a computer system, a telephone system, or any other communication system. The edge device supervises the buffer and monitors the number of buffer locations being used by each channel or connection.

According to another exemplary aspect of the present invention, the edge device communicates data from an ATM interface to the buffer. The buffer locations in the buffer are allocated on a per connection basis. The edge device proactively limits the number of buffer locations utilized by each connection. If too many buffer locations are used by one connection, the edge device will not allow data cells from that connection to reach the buffer.

In yet another exemplary aspect of the present invention, the edge device utilizes a number of registers or counters to keep track of the number of buffer locations used by each connection. Each counter is associated with a single connection. The counter associated with a particular connection is decremented each time data is provided to a buffer location from the particular connection. The counter is incremented after the system connected to the edge device obtains the data from the buffer location.

Embodiments of the present invention can advantageously limit the total number of buffers that can be used for each connection to provide fire wall protection. Preferably, the total number of buffers useable for each connection is greater than the total number of buffers divided by the total number of connections. With such a scheme, each connection is not unduly limited as most connections are not utilized and certainly are not utilized to their maximum capacity. Thus, connections which have heavy traffic are not unduly limited. The edge device advantageously prevents excessive congestion from a particular channel from interfering with the operation of systems coupled to the edge device without unnecessarily limiting other connections.

BRIEF DESCRIPTION OF THE DRAWINGS

The invention will hereafter be described with reference to the accompanying drawings wherein like numerals denote like elements, and.

DETAILED DESCRIPTION OF THE PREFERRED EXEMPLARY EMBODIMENT OF THE PRESENT INVENTION

Figure 1:
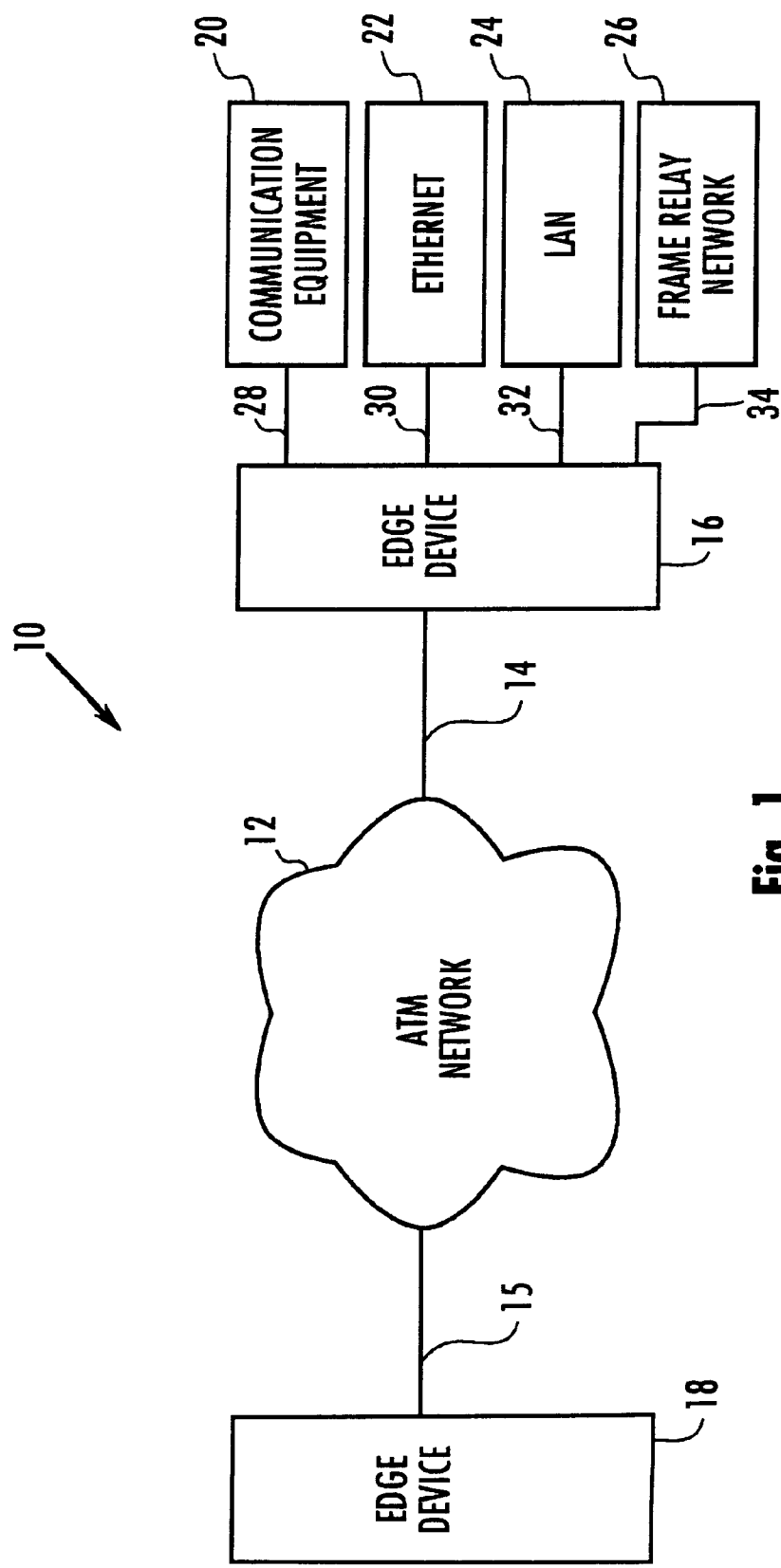
FIG. 1 is a general schematic block diagram of a communication system in accordance with an exemplary embodiment of the present invention.

With reference to FIG. 1, a communication system 10 includes a connection-oriented system or an asynchronous transfer mode system 12, an edge device 16, an edge device 18, communication equipment 20, an ethernet 22, a local area network (LAN) 24, and a frame relay network 26. ATM system 12 can be a network or other connection-oriented communication system. System 12 can be part of a public or private network. System 12 preferably transfers data or cells across a number of connections to edge devices 16 and 18, to systems within system 12, and to other ATM systems, networks, or other devices.

Edge device 16 is coupled to ATM system 12 by a communication line 14, and edge device 18 is coupled to ATM system 12 by a communication line 15. System 12 transfers data or cells across the various connections (not shown) associated with system 12. Connections are essentially defined by a source and a destination provided in each cell. The cells are physically transmitted across system 12 on communication lines, such as, telephone lines, cables, optical fibers, satellite links, air waves, or other medium. One physical link can house a large number of logical connections.

Edge device 16 preferably provides a buffer between ATM system 12 and communication equipment 20, ethernet 22, LAN 24, and network 26. Communication equipment 20 can include LANs, work stations, PCs, mainframes, terminal controllers, video conferencing studios, or other communication devices. Similarly, LAN 24, ethernet 22, and frame relay network 26 can be any type of computer network or computer system. Equipment 20, ethernet 22, LAN 24, and network 26 can be public or private systems, including private ATM networks which are coupled to system 12 by edge device 16 via communication lines 28, 30, 32, and 34, respectively. The present invention is described with respect to ATM system 12, and equipment 20, ethernet 22, LAN 24, and network 26 in an exemplary fashion only. Edge device 16 can be coupled between various types of equipment, networks, and systems without departing from the scope of the invention. Additionally, the type of data and data protocol does not limit the scope of the invention, and edge device 16 can take many forms. For example, edge devices 16 and 18 can be terminal equipment, computer equipment, adaptation equipment, network equipment, communication equipment, or other devices. Edge devices 16 and 18 can be coupled to one other system or to a large number of systems.

Devices 16 and 18 are any devices which are coupled between at least two systems, networks, or pieces of equipment and which perform buffering operations for the interchange of data between the at least two systems, network, or pieces of equipment.

Data in the form of cells or other packets is transmitted from edge device 18 through line 15 to system 12. The cell is transmitted across one of a number of connections associated with system 12. After the cell is transmitted through system 12, edge device 16 receives the cell via system 12 and line 14. Edge device 16 transmits the cell to equipment 20, ethernet 22, LAN 24, or network 26 through communication lines 28, 30, 32, and 34, respectively. Edge device 16 can provide a variety of translation, adaptation, segmentation, and reassembly operations for the data cell. Similar to the operation described above, cells or data can be transferred from equipment 20, ethernet 22, LAN 24, and frame relay network 26 to system 12 and to edge device 18. Additionally, data can be transferred or communicated to other components attached to or within system 12.

As data cells are transmitted across system 12 to edge device 16, edge device 16 generally provides translations of the cells and provides data indicative of the cells to equipment 20, ethernet 22, LAN 24, or network 26. For example, edge device 16 can be a router, multiplexer, adaptation device, or other equipment for providing information to various types of equipment, such as, LANs, work stations, PCs, mainframes, terminal controllers, terminal equipment, and video conferencing studios. Edge device 16 may provide layer translation for other types of networks which have communication protocols different than ATM system 12. As ATM system 12 provides cells to device 16, communication equipment 20, ethernet 22, LAN 24, or network 26 can become congested if a large amount of data is provided from device 16. If too much data is provided, edge device 16 as well as communication equipment 20, ethernet 22, LAN 24, and network 26 can become congested. Such congestion can cause less than optimal operation of equipment 20, ethernet 22, LAN 24, and network 26. In addition to malfunctions, congestion can cause communications to cease. Device 16 advantageously proactively prevents equipment 20, ethernet 22, LAN 24, and frame relay network 26 from becoming congested by providing fire wall protection.

Figure 2:
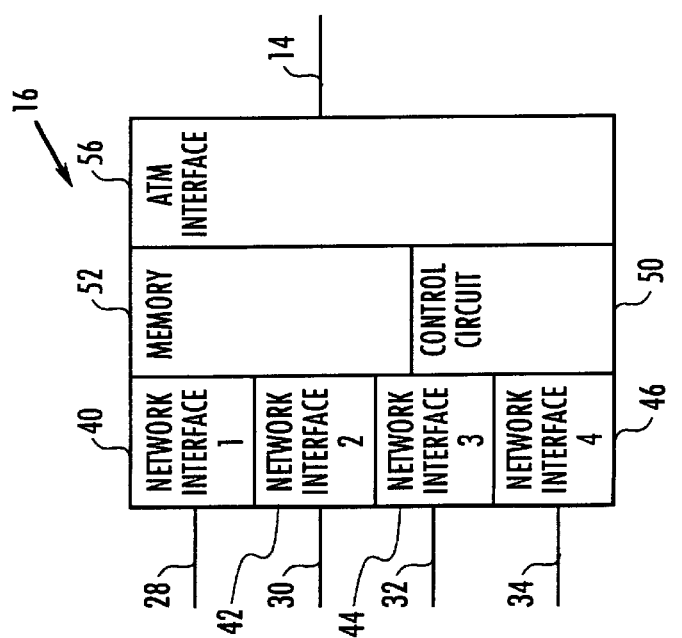
FIG. 2 is a more detailed schematic block diagram of an edge device utilized in the communication system illustrated in FIG. 1.

With reference to FIG. 2, edge device 16 includes a network interface 40, a network interface 42, a network interface 44, and a network interface 46 coupled to communication lines 28, 30, 32, and 34, respectively. Network interfaces 40, 42, 44, and 46 can be any type of interface for coupling to various types of equipment. Alternatively, edge device could include more or less interfaces 40, 42, 44, and 46. Edge device 16 also includes a control circuit 50, a memory 52, and an ATM interface 56. ATM interface 56 is coupled to communication line 14. Memory 52 is coupled between interfaces 40, 42, 44, and 46, and interface 56. Control circuit 50 is coupled to memory 52 and to interface 56.

Memory 52 preferably serves as a buffer between ATM interface 56 and interfaces 40, 42, 44, and 46. As cells are received from communication line 14 at ATM interface 56, control circuit 50 stores the cells in memory 52 for eventual transmission to communication lines 28, 30, 32, and 34 via interfaces 40, 42, 44, and 46, respectively. Control circuit 50 preferably limits the number of cells per connection stored in memory 52. In this way, control circuit 50 ensures that equipment 20, ethernet 22, LAN 24, and network 26 do not become overly burdened or congested by particular connections associated with system 12. For example, if a particular connection is providing an overly large number of cells to ATM interface 56, control circuit 50 would not store the cells in memory 52 after a particular number of cells were stored in memory 52 for that connection.

Control circuit 50 proactively limits traffic being stored in memory 52 (and hence traffic or cells to lines 28, 30, 32, and 34) based upon the availability of storage locations in memory 52 per connection. Every connection associated with system 12 is evaluated by circuit 50 separately so other connections which do not require a large number of storage locations can continue to utilize edge device 16, even though a connection which requires a large number of storage locations is prevented from accessing memory 52.

Figure 3:
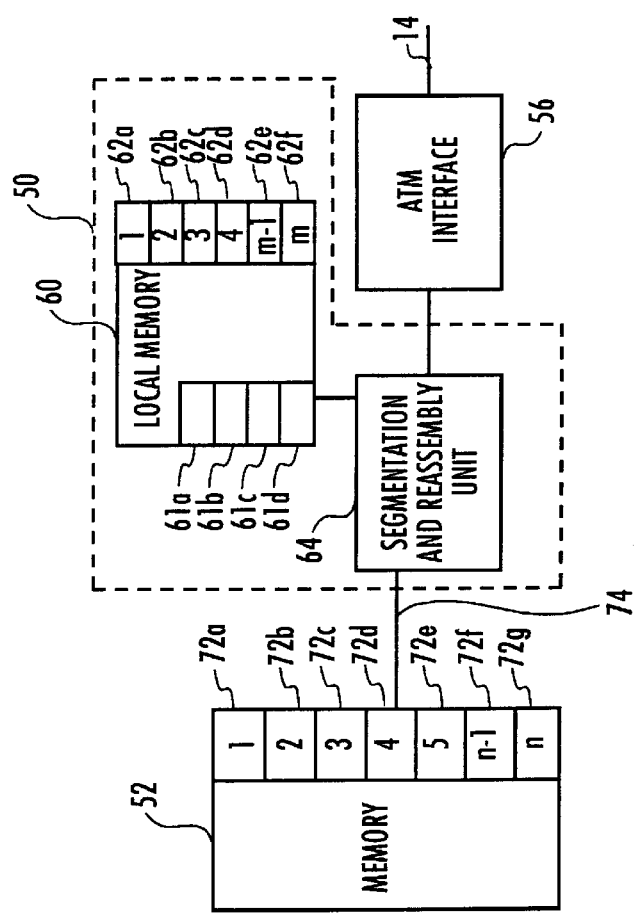
FIG. 3 is an even more detailed block diagram of the edge device illustrated in FIG. 2.

With reference to FIG. 3, memory 52 is a host memory unit and includes storage locations 72a, 72b, 72c, 72d, 72e, 72f, and 72g. By way of example, communication system 10 and ATM system 12 preferably have m (e.g., 1,000 connections) connections and memory 52 preferably has n (e.g., 4,000 locations) storage locations 72a–g. Each of storage locations 72a–g preferably includes 256 bytes for storing the data cells. Memory 52 is preferably coupled to control circuit 50 by a host data bus 74.

Control circuit 50 includes a local memory 60 and a segmentation and reassembly (SAR) unit 64. Unit 64 is coupled to local memory 60. Local memory 60 includes registers or counters 62a, 62b, 62c, 62d, 62e, and 62f. Counters 62a–f preferably include one counter for each connection (e.g., m counters). Therefore, local memory 60 for the exemplary communication system 10 includes 1,000 counters, each counter being associated with a particular connection. Memory 60 has a number of free buffer queues such as queues 61a–d. Queues 61a–d store credit words and pointers to free memory locations of locations 72a–g.

In operation, when unit 64 receives a data cell associated with a particular connection, ATM interface 56 determines with which connection the data cell is associated. Unit 64 then checks the particular counter associated with that connection of counters 62a–f to determine the number of storage locations 72a–g being utilized by the connection. If the number of storage locations 72a–g being utilized by the connection are below a threshold, unit 64 provides the cell to a storage location of storage location 72a–g for eventual transmission via network interfaces 40, 42, 44, and 46 to equipment 20, ethernet 22, LAN 24, or network 26. If the particular counter of counters 62a–f indicates that the connection is utilizing a maximum number of storage locations 72a–g, unit 64 discards the cell and does not allow transmission of the cell to memory 52. In this way, unit 64 prevents too many data cells from a particular connection from entering memory 52 and, hence, equipment 20, ethernet 22, LAN 24, and network 26.

Counters 62a–f store representations of the number of memory locations 72a–g being utilized by each connection. Each counter 62a–f preferably represents a particular connection and is initially set to the maximum number of storage locations allowed for the channel it represents. In this example, the maximum number is preferably 400. Each of counters 62a–f initially stores the same maximum number. However, different initial numbers for counters 62a–f could also be used. The counter associated with the connection is decremented each time a cell from the connection is stored in locations 72a–g.

When the cell is transmitted from storage locations 72a–g to network interfaces 40, 42, 44, and 46, (e.g., the cell does not need to be stored in locations 71a–g anymore), the counter for the connection is incremented to reflect that the storage of location for the connection is no longer being utilized. If the counter reaches zero, the maximum number of storage locations for the connection has been reached, and unit 64 does not allow any more cells from the connection to be stored in locations 72*a–g*.

Although the particular embodiment described includes counters, such as, counters 62*a–f*, any apparatus for and method of keeping track of the number of storage locations being utilized per connection can be utilized without departing from the scope of the invention as recited in the claims. For example, registers could be utilized, or counters that count up to the maximum number of storage locations could be utilized.

Figure 4:
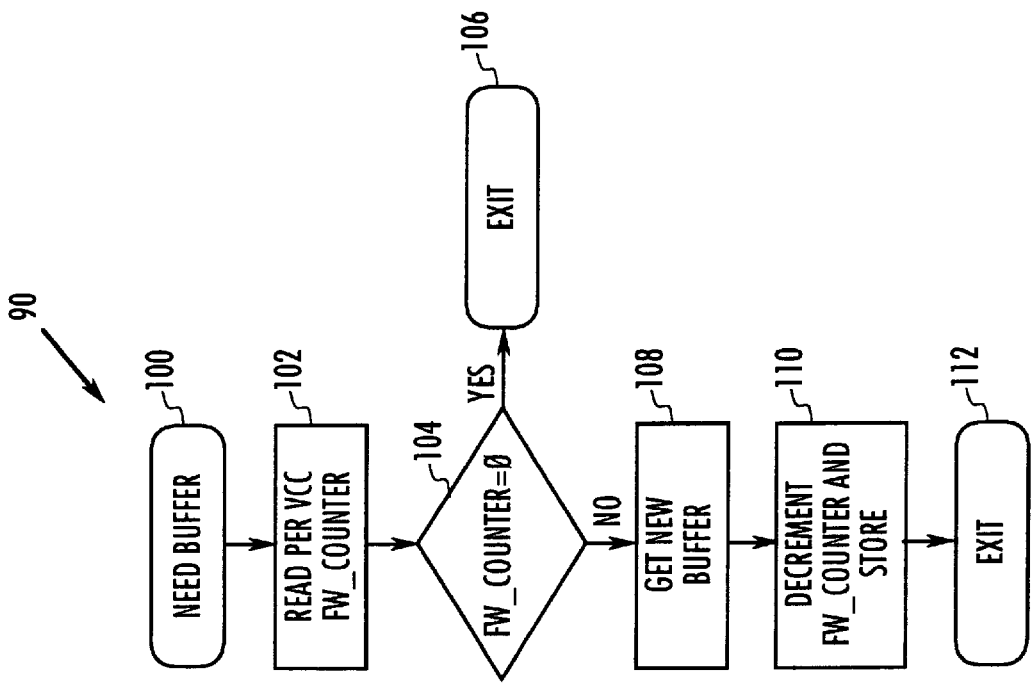
FIG. 4 is a flow chart illustrating the operation of the fire wall protection operation of the edge device.

With reference to FIG. 4, the operation of unit 64 is described with respect to a subroutine 90. When unit 64 receives data, such as, a cell from system 12, unit 64 determines whether one of storage locations 72*a–g* is needed at a step 100. If one of storage locations 72*a–g* is needed, unit 64 reads a counter (FW counter) associated with the connection (VCC) of counters 62*a–f* from local memory 60 at a step 102. If the counter is not equal to zero (e.g., indicating that there are storage locations available for the particular connection), unit 64 places the cell in a storage location of storage location 72*a–g* in memory 52 at a step 108. After step 108, the counter (FW counter) of counters 62*a–f* is decremented to reflect that another storage location of storage location 72*a–g* is being utilized by the connection at step 110. After step 110, unit 64 exits subroutine 90.

At step 104, if the counter of counters 62*a–f* is equal to zero, no storage locations 72*a–g* are available for use by the connection. Therefore, unit 64 discards the cell received at ATM interface 56 and does not allow the cell to pass to storage location 72*a–g* in memory 52 at a step 106. Unit 64 exits subroutine 90 at step 106.

Figure 5:
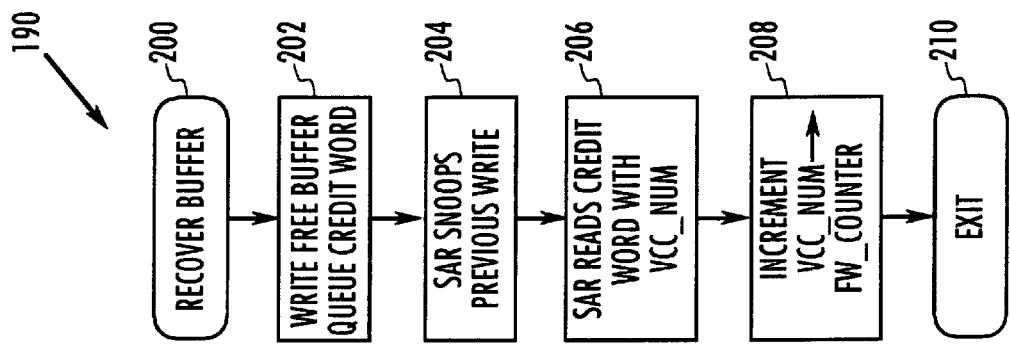
FIG. 5 is a flow chart illustrating the fire wall protection operation of the edge device.

With reference to FIG. 5, the operation of unit 64 of control circuit 50 is further described with reference to FIG. 5 and a subroutine 190. When data associated with the cells stored in storage location 72*a–g* is transmitted through interfaces 40, 42, 44, and 46 (no longer needed in memory 52) in a step 200, unit 64 is signalled that a storage location of location 72*a–g* has been freed or relieved in a step 202. Unit 64 can receive a signal (e.g., credit word) from the devices coupled to interfaces 40, 42, 44, and 46, by memory 52, or by interfaces 40, 42, 44, and 46. The signal is preferably provided to a free buffer queue which can be read by unit 64.

In response to the signal indicating that the storage location is free (e.g., the credit word), unit 64 snoops memory 60 to determine the location of locations 61*a–d* to which the signal applies in a step 204. In this way, unit 64 determines which location of location 72*a–g* is now available. At step 206, unit 64 reads the signal (e.g., the credit word) which indicates with which connection the now free storage location of locations 72*a–g* was associated. At a step 208, unit 64 increments the counter of counters 62*a–f* associated with the connection. At a step 210, unit 64 exits subroutine 190.

Subroutines 90 and 190 ensure that unit 64 and counters 62*a–f* keep accurate determinations of how many buffers are being utilized by each connection. Subroutines 90 and 190 are preferably run by the unit 64 and can be implemented in a variety of software languages or hardware state machines. However, steps 200 and 202 of subroutine 190 are performed by equipment 20, ethernet 22 and LAN 24 or network 26.

It is understood that, while the detailed drawings and specific examples given describe the exemplary embodiments of the present invention, they are for the purpose of illustration only. The apparatus and method of the invention is not limited to the precise details, devices, networks, and systems disclosed. For example, although a SAR unit is utilized in control circuit 50, other types of data controllers could be utilized. Further, although counters are utilized, other types of storage methodologies could be used to determine how many storage locations in the buffer memory are utilized per connection. Various changes can be made to the details disclosed without departing from the spirit of the invention which is defined by the following claims.

What is claimed is:

1. An edge device for use with a connection-oriented system having a plurality of connections, the edge device comprising:

a connection-oriented system interface adapted to be coupled to the connection-oriented system;

a memory having a plurality of memory locations; and a control circuit coupled to the connection-oriented system interface and to the memory to transfer data associated with the connections to the memory locations, the control circuit including a storage element, the storage element storing the number of the memory locations being utilized by each connection of the connections, the control circuit transferring the data associated with a particular connection of the connections to the memory in response to the number of memory locations being utilized by the particular connection of the connections being below a threshold, wherein the control circuit prevents transfer of the data associated with the particular connection to the memory in response to the number of memory locations being utilized by the particular connection of the connections being above the thresholds;

wherein the control circuit discards the data associated with the particular connection before the data is stored in the memory, if the number of memory locations being used by the particular connection is above the threshold;

wherein the threshold is greater than the number of memory locations in the memory divided by the number of connections.

2. The edge device of claim 1 wherein the storage element includes a plurality of registers corresponding to the plurality of connections.

3. The edge device of claim 2 wherein the storage element includes a plurality of counters corresponding to the plurality of connections.

4. The edge device of claim 1 further comprising:

at least one network interface adapted to be coupled to a computer system network, the network interface being coupled to said memory, the memory being coupled between the connection-oriented system interface and the network interface.

5. The edge device of claim 4 wherein the connection-oriented system is an ATM network.

6. The edge device of claim 1 wherein the threshold is 400, the number of connections is 1000 and the number of memory locations is 4000.

7. The edge device of claim 1 wherein the memory further includes free buffer queues, the free buffer queues storing pointers to free memory locations of the memory locations.

8. A method of operating an edge device for use with a connection-oriented system having a plurality of communication connections, the edge device including a memory having a plurality of memory locations, the method comprising:

receiving data from a particular connection of the communication connections;

obtaining a value representative of the number of the memory locations used by the particular connection;

placing the data in a particular memory location of the memory locations if the value representative of the number of memory locations used by the particular connection indicates that at least one memory location of the memory locations for the particular connection is available;

not allowing the data to reach the particular memory location if the value representative of the number of memory locations used by the particular connection indicates that at least one memory location of the memory locations for the particular connection is not available;

adjusting the value of the number of the memory locations used by the particular connection when a memory location other than the particular memory location no longer must store the cell; and snooping the memory before performing the adjusting step.

9. The method of claim 8 further comprising:

discarding the data if the number of the memory locations is above a threshold.

10. The method of claim 8 further comprising:

storing a pointer to a free memory location of the memory location after the data is transferred from the memory.

11. A method of operating an edge device for use with an asynchronous transfer mode system having a plurality of communication connections, the edge device including a buffer having a plurality of buffer locations coupled between an asynchronous transfer mode interface and a system interface, the method comprising:

receiving a cell associated with a particular connection of the communication connections;

reading an indication of the number of buffer locations used by the particular connection from a storage location;

placing the cell in a particular buffer location of the buffer locations if the number of buffer locations used by the particular connection is below a threshold, and adjusting the indication of the number of buffer locations used by the particular connection; and not allowing the cell to reach the particular buffer locations if the number of buffer locations used by the particular connection is above or equal to the threshold;

wherein the threshold is greater than the number of buffer locations in the buffer divided by the number of connections.

12. The method of claim 11 wherein the not allowing includes discarding the cell if the number of locations is above a threshold.

13. The method of claim 11 further comprising:

adjusting the indication of the number of buffer locations used by the particular connection when a buffer location after the particular buffer location no longer must store the cell.

14. The method of claim 11 wherein the indication is stored in a counter as a representation of the number of buffer locations left for the particular connection.

15. The method of claim 11 wherein the edge device is between the asynchronous transfer mode interface and the system interface.

16. The method of claim 11 wherein the buffer is a host memory unit.

17. The method of claim 11 further comprising:

storing a pointer to a free buffer location after a cell has been sent from the buffer.

18. A method of operating an edge device for use with an asynchronous transfer mode system having a plurality of communication connections, the edge device including a buffer having a plurality of buffer locations coupled between an asynchronous transfer mode interface and a system interface, the method comprising:

receiving a cell associated with a particular connection of the communication connections;

reading an indication of the number of buffer locations used by the particular connection from a storage location;

placing the cell in a particular buffer location of the buffer locations if the number of buffer locations used by the particular connection is below a threshold, and adjusting the indication of the number of buffer locations used by the particular connection;

not allowing the cell to reach the particular buffer locations if the number of buffer locations used by the particular connection is above or equal to the threshold;

wherein the threshold is greater than the number of buffer locations in the buffer divided by the number of connections;

adjusting the indication of the number of buffer locations used by the particular connection when a buffer location other than the particular buffer location no longer must store the cell; and snooping the buffer before performing the adjusting step.

* * * * *